US012593832B2

(12) United States Patent

Nakagawa

(10) Patent No.: US 12,593,832 B2

(45) Date of Patent: Apr. 7, 2026

(54) NUT, FISHING ROD REEL SEAT, AND FISHING ROD

(71) Applicant: GLOBERIDE, INC., Higashikurume (JP)

(72) Inventor: Shintaro Nakagawa, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/950,797

(22) Filed: Nov. 18, 2024

(65) Prior Publication Data

US 2025/0280810 A1 Sep. 11, 2025

(30) Foreign Application Priority Data

Mar. 8, 2024 (JP) ................................. 2024-035561

(51) Int. Cl.
A01K 87/06 (2006.01)

(52) U.S. Cl.
CPC .................................... A01K 87/06 (2013.01)

(58) Field of Classification Search
CPC ..... A01K 87/06; A01K 87/008; A01K 87/009
See application file for complete search history.

(56) References Cited

U.S. PATENT DOCUMENTS 4,485,580 A * 12/1984 Ohmura .................. A01K 87/06
43/22
4,918,852 A * 4/1990 Yamato .................. A01K 87/06
43/25

5,481,820 A * 1/1996 Ohmura .................. A01K 87/06
43/22
6,871,441 B1 * 3/2005 Tsurufuji ............... A01K 87/06
43/22
2023/0232801 A1 * 7/2023 Morioka ............ A01K 89/0192
43/22

FOREIGN PATENT DOCUMENTS

CN 113558017 A * 10/2021 ............. A01K 87/06
CN 114467872 A * 5/2022 ............. A01K 87/06
(Continued)

OTHER PUBLICATIONS

JP-2020089310-A text (Year: 2020).*
(Continued)

*Primary Examiner* — Katelyn T Truong
(74) *Attorney, Agent, or Firm* — OLIFF PLC.

(57) ABSTRACT

A nut according to an embodiment of the present invention comprises: a nut base portion which has an outer peripheral surface provided with a recessed portion and an inner peripheral surface provided with a female screw portion for movement that is screwed into the male screw portion of the reel seat main body, and of which an end portion is locked to the hood main body of the movable hood; and a cylindrical portion that has a protrusion portion engaged with the recessed portion such that the cylindrical portion is fixed on an outside of the nut base portion, in which in a state where the protrusion portion of the cylindrical portion is engaged with the recessed portion of the nut base portion, the nut base portion is press-fitted and fixed in a circumferential direction and a radial direction of the nut base portion by the cylindrical portion.

16 Claims, 10 Drawing Sheets

(56) References Cited

FOREIGN PATENT DOCUMENTS

| | | | | | |
|----|----|----|----|----|----|
| JP | H06-276899 | A | | 10/1994 | |
| JP | 2006-333723 | A | | 12/2006 | |
| JP | 4022284 | B2 | | 12/2007 | |
| JP | 2018-068227 | A | | 5/2018 | |
| JP | 2019-033699 | A | | 3/2019 | |
| JP | 6499119 | B2 | | 4/2019 | |
| JP | 2020089310 | A | * | 6/2020 | |
| JP | 2020103324 | A | * | 7/2020 | |
| JP | 7376449 | B2 | * | 11/2023 | ............. A01K 87/06 |
| KR | 200202744 | Y1 | * | 11/2000 | ............. A01K 87/08 |
| KR | 20070103665 | A | * | 10/2007 | ............. A01K 87/06 |
| WO | WO-2022070697 | A1 | * | 4/2022 | ............. A01K 87/06 |
| WO | WO-2023248508 | A1 | * | 12/2023 | ............. A01K 87/06 |

OTHER PUBLICATIONS

WO-2023248508-A1 text (Year: 2023).*
KR 20070103665 A text translation (Year: 2007).*
May 16, 2025 Search and Examination Report issued in British Patent Application No. GB2418047.3.
Nov. 18, 2025 Examination Report issued in Australian Application No. 2024266954.

* cited by examiner

NUT, FISHING ROD REEL SEAT, AND FISHING ROD

CROSS-REFERENCE TO RELATED APPLICATION

This application claims priority under 35 U.S.C. § 119 to Japanese Patent Application No. 2024-035561 filed on Mar. 8, 2024 in the Japanese Patent Office, the entire contents of each hereby incorporated by reference.

BACKGROUND OF THE INVENTION

1. Technical Field

The present invention relates to a nut, a fishing rod reel seat comprising the nut, and a fishing rod comprising the fishing rod reel seat.

2. Description of the Related Art

In the related art, various devices for fixing a fishing rod attachment leg of a fishing reel to a fishing rod are known. Such a reel fixing device disclosed usually includes a reel seat main body provided with a placing portion on which a fishing rod attachment leg of a fishing reel is placed. A fixed hood for fixing one end of the fishing rod attachment leg is provided at one end of the reel seat main body. A movable hood is attached to the other end of the reel seat main body so as to be movable facing the fixed hood.

The movable hood usually includes an insertion portion into which the other end of the fishing rod attachment leg is inserted, and an operation knob rotatably attached to the insertion portion. The operation knob includes a cylindrical base portion screwed to a screw portion provided at the other end of the reel seat main body, and a cover member for decoration attached to an outer peripheral surface of the base portion. At that time, usually, the cover member is fixed to the base portion using an adhesive, and the adhesive is applied to both the outer peripheral surface of the base portion and an inner peripheral surface of the cover member.

As such an operation knob, JP 2020-89310 A discloses a nut of a fishing rod reel seat, the nut being screwed to a male screw portion of a reel seat main body to move a movable hood, the nut including: an inner cylindrical body having an inner peripheral surface provided with a moving female screw portion screwed to the male screw portion of the reel seat main body; and an outer cylindrical body fixed to an outside of the inner cylindrical body, the outer cylindrical body having an outer peripheral surface serving as at least a part of an outer peripheral surface of the nut, in which the outer cylindrical body has a through-hole penetrating in an inward and outward direction, and a fixing portion that fixes the outer peripheral surface of the inner cylindrical body and the inner peripheral surface of the outer cylindrical body at a position farther from the movable hood than the through-hole. In addition, the fixing portion preferably has at least one of an adhesive portion and a screw portion, and in a case where the fixing portion has the adhesive portion, the outer peripheral surface of the inner cylindrical body and the inner peripheral surface of the outer cylindrical body can be easily fixed by adhesion.

SUMMARY OF THE INVENTION

However, in the nut for moving the movable hood disclosed in JP 2020-89310 A, a fixing portion for fixing the outer peripheral surface of the inner cylindrical body and the inner peripheral surface of the outer cylindrical body is provided, and the outer peripheral surface of the inner cylindrical body and the inner peripheral surface of the outer cylindrical body are fixed by adhesion or a screw fastening structure. Therefore, there is a problem that not only the structure comprising the fixing portion is complicated, but also the process of adhesion or screw fastening is unavoidable, and the process is also complicated in manufacturing.

The present invention has been made in view of the above circumstances, and an object thereof is to provide a nut capable of reliably performing the fixing between the cylindrical portion and the nut base portion while reducing rattling of the cylindrical portion with respect to the nut base portion in a rotation direction and the axial direction, a fishing rod reel seat comprising the nut, and a fishing rod comprising such a fishing rod reel seat. Other objects of the present invention will become apparent upon reference to the entirety of the present specification.

A nut according to an embodiment of the present invention is for moving a hood main body of a movable hood, the nut is screwed with a male screw portion of a reel seat main body formed with a reel leg placing portion on which a reel leg is placed, and the nut comprises: a nut base portion which has an outer peripheral surface provided with a recessed portion and an inner peripheral surface provided with a female screw portion for movement that is screwed into the male screw portion of the reel seat main body, and of which an end portion is locked to the hood main body of the movable hood; and a cylindrical portion that has a protrusion portion engaged with the recessed portion such that the cylindrical portion is fixed on an outside of the nut base portion, in which in a state where the protrusion portion of the cylindrical portion is engaged with the recessed portion of the nut base portion, the nut base portion is press-fitted and fixed in a circumferential direction and a radial direction of the nut base portion by the cylindrical portion.

In the nut according to the embodiment of the present invention, the nut base portion has a plurality of groove portions that extend in a central axis direction of the nut base portion and are formed on an outer peripheral surface of the nut base portion, and the recessed portion is a part of the groove portion.

In the nut according to the embodiment of the present invention, the groove portion comprises a base portion, an inclined portion, a top portion, and the recessed portion from a side of the groove portion opposite to the hood main body of the movable hood.

In the nut according to the embodiment of the present invention, the protrusion portion of the cylindrical portion comprises an inclined portion that is formed on the hood main body side of the movable hood and of which a height is increased as a distance from the movable hood is increased.

In the nut according to the embodiment of the present invention, the protrusion portion of the cylindrical portion comprises the inclined portion and an upper surface portion as viewed in a central axis direction of the cylindrical portion.

In the nut according to the embodiment of the present invention, the upper surface portion is a flat surface portion extending in the central axis direction of the cylindrical portion.

In the nut according to the embodiment of the present invention, a length of the protrusion portion of the cylindrical portion in a central axis direction of the cylindrical portion is 3 mm or more.

In the nut according to the embodiment of the present invention, a length of the flat surface portion in the central axis direction of the cylindrical portion is a length in a range of 0.3 mm to 1.5 mm.

In the nut according to the embodiment of the present invention, the protrusion portion of the cylindrical portion comprises the upper surface portion and a curved portion extending from both sides of the upper surface portion in the circumferential direction as viewed in the circumferential direction of the cylindrical portion, and a roundness radius (R) of an end portion of the curved portion on a side opposite to the upper surface portion is a size in a range of 0.5 mm to 0.8 mm.

In the nut according to the embodiment of the present invention, the plurality of groove portions are two or more groove portions.

In the nut according to the embodiment of the present invention, a depth of the base portion of the groove portion is deeper than a depth of the recessed portion of the groove portion in a range of 0.1 mm to 0.2 mm.

In the nut according to the embodiment of the present invention, the nut base portion has hardness lower than hardness of the cylindrical portion.

In the nut according to the embodiment of the present invention, the protrusion portion of the cylindrical portion has an inclined portion, and an inclination angle of the inclined portion of the groove portion is the same as or different from an inclination angle of the inclined portion of the protrusion portion of the cylindrical portion.

A fishing rod reel seat according to an embodiment of the present invention comprises any one of the nuts described above.

A fishing rod according to an embodiment of the present invention comprises: a fishing rod reel seat having the nut according to any one of the nuts described above; and a rod body.

A nut according to an embodiment of the present invention is for moving a hood main body of a movable hood, the nut is screwed with a male screw portion of a reel seat main body formed with a reel leg placing portion on which a reel leg is placed, and the nut comprises: a nut base portion which has an outer peripheral surface provided with a protrusion portion and an inner peripheral surface provided with a female screw portion for movement that is screwed into the male screw portion of the reel seat main body, and of which an end portion is locked to the hood main body of the movable hood; and a cylindrical portion that has a recessed portion engaged with the protrusion portion such that the cylindrical portion is fixed on an outside of the nut base portion, in which in a state where the recessed portion of the cylindrical portion is engaged with the protrusion portion of the nut base portion, the nut base portion is press-fitted and fixed in a circumferential direction and a radial direction of the nut base portion by the cylindrical portion.

According to the embodiments, it is possible to provide a nut capable of reliably performing the fixing between the cylindrical portion and the nut base portion while reducing rattling of the cylindrical portion with respect to the nut base portion in a rotation direction and the axial direction, a fishing rod reel seat comprising the nut, and a fishing rod comprising such a fishing rod reel seat.

DETAILED DESCRIPTION

Hereinafter, embodiments of a nut, a reel seat, and a fishing rod according to the present invention will be specifically described with reference to the accompanying drawings. Components that are common in a plurality of drawings are denoted by the same reference signs throughout the plurality of drawings. It should be noted that each drawing is not necessarily drawn to an accurate scale for the sake of convenience in description.

Figure 1:
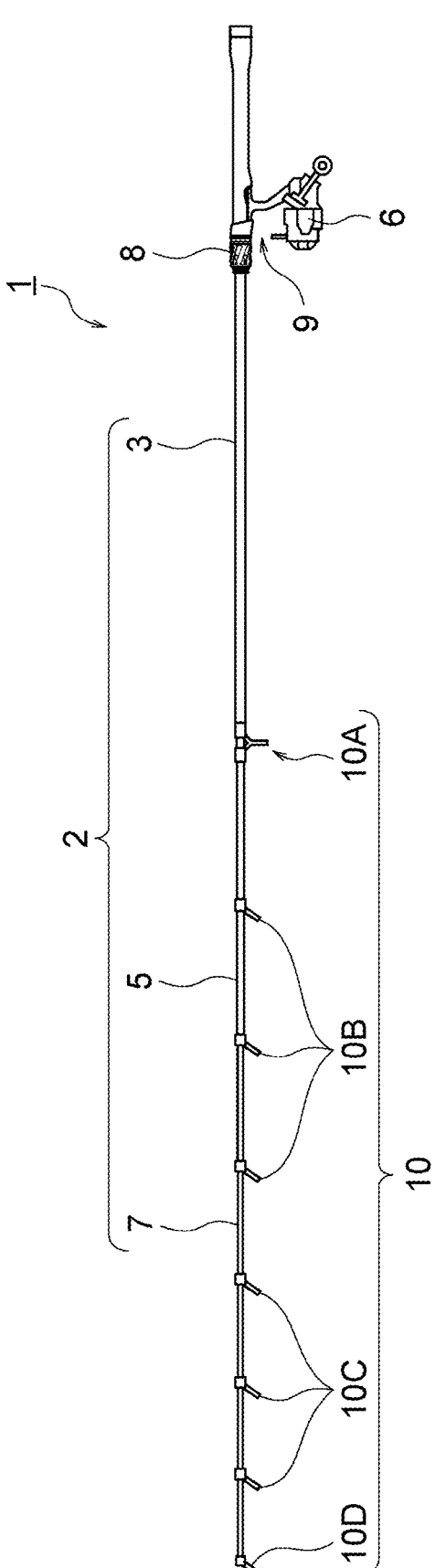
FIG. 1 is a view illustrating a fishing rod according to an embodiment of the present invention.

FIG. 1 is a view illustrating a fishing rod according to an embodiment of the present invention. As illustrated in the drawing, a fishing rod 1 according to an embodiment of the present invention comprises a rod body 2, a reel 6 attached to the rod body 2 via a reel seat 9, and a fishing line guide 10 attached to the rod body 2. In the illustrated embodiment, each of the reel seat 9 and the fishing line guide 10 corresponds to attachment components attached to an outer peripheral surface of the rod body.

The rod body 2 is formed, for example, by connecting a base rod 3, a middle rod 5, a tip rod 7, and the like to each other. These rod bodies are jointed to each other, for example, as an ordinarily jointed type. The base rod 3, the middle rod 5, and the tip rod 7 can be joined to each other by a telescopic type, an inversely jointed type, a socket-and-spigot jointed type, or any other known joining method. The rod body 2 may be constituted by a single rod body.

Each of the base rod 3, the middle rod 5, and the tip rod 7 is constituted by, for example, a tubular body made of a fiber-reinforced resin. This tubular body made of a fiber-reinforced resin is produced by winding a fiber-reinforced resin prepreg (prepreg sheet) obtained by impregnating reinforcing fibers with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. An outer surface of the tubular body is appropriately polished. Each rod body may be provided in a solid state.

In the illustrated embodiment, the base rod 3, the middle rod 5, and the tip rod 7 are provided with a plurality of fishing line guides 10 (fishing line guides 10A to 10D) for guiding a fishing line fed from the reel 6 attached to the reel seat 9. More specifically, the base rod 3 is provided with the fishing line guide 10A, the middle rod 5 is provided with the fishing line guide 10B, and the tip rod 7 is provided with the fishing line guide 10C. A top guide 10D is provided on a distal end of the tip rod 7, but this is not described in detail.

Next, the reel seat 9 comprising a reel seat main body 12 and a nut 8 according to the embodiment of the present invention will be described with reference to FIG. 2. As illustrated, the reel seat 9 according to the embodiment of the present invention comprises the reel seat main body 12 having, along its axial direction, a reel leg placing surface (reel leg placing portion) 12a on which a reel leg 6a of the fishing reel 6 is placed. The reel seat main body 12 is provided in a cylindrical shape as a whole. In addition, the reel seat main body 12 is provided by an appropriate material such as a synthetic resin (for example, polyamide-based synthetic resin, ABS resin, or the like) or metal (for example, SUS, aluminum, titanium, brass, or the like). The reel seat main body 12 can be configured with, for example, a length of 60 to 160 mm, but is not limited thereto.

In addition, the reel seat main body 12 comprises a grip portion 12b that slightly bulges opposite to the reel leg placing surface 12a, and that has a curved outer surface which is made easy to grip by supporting the thenar or the vicinity thereof when gripped with a gripping hand.

Figure 2:
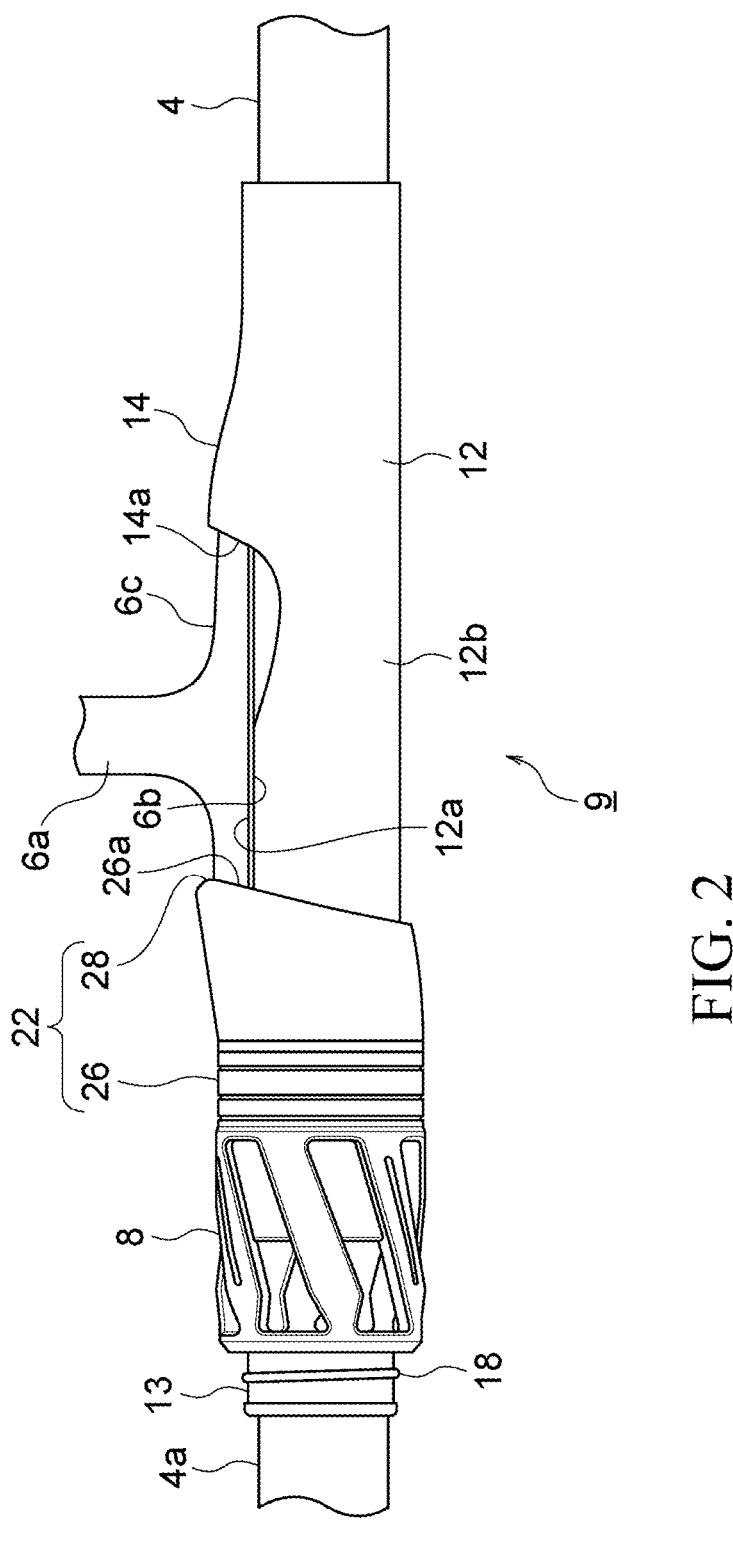
FIG. 2 is a view illustrating a fishing rod reel seat according to an embodiment of the present invention.

The reel leg placing surface 12a of the reel seat main body 12 can be formed flat or substantially flat with a larger curvature than other circumferential portions (for example, the grip portion 12b) adjacent to the reel leg placing surface 12a of the reel seat main body 12, and is formed to extend in the axial direction of the reel seat main body 12 illustrated in FIG. 2. A fixed hood 14 is integrally disposed at one end (rod base side) of the reel seat main body 12. One end of the reel leg placing surface 12a of the reel seat main body 12 is disposed inside the fixed hood 14.

The reel seat main body 12 is integrally provided with a cylindrical body in which a guide groove is formed at the other end (rod butt side) and a screw portion (male screw portion) 18. In the cylindrical body, a cylindrical portion placing surface 13 is formed continuously with the reel leg placing surface 12a of the reel seat main body 12 or with a slight step. The cylindrical portion placing surface 13 is also formed continuously with the screw portion (male screw portion) 18. At the other end (rod butt side), a movable hood 22 is attached to the outside of the cylindrical body and the screw portion 18 so as to be movable in the axial direction. Here, the reel seat 9 may be referred to as comprising the reel seat main body 12 and the movable hood 22, or the reel seat main body 12, the movable hood 22, and the nut 8 that will be described later, but details are omitted. In addition, the movable hood 22 may refer to a hood main body 26 and a reel leg holding portion 28 to be described later, or may be referred to as the movable hood 22 comprising the nut 8. However, in the present specification, the latter case will be assumed.

As illustrated in FIG. 2, in the fixed hood 14 of the reel seat main body 12, an opening portion 14a that receives one end of the reel leg 6a is opened toward the movable hood 22. The opening portion 14a of the fixed hood 14 is formed such that the height of an inner surface is gradually decreased toward a front of the reel seat main body 12. When one end of the reel leg 6a is received in the opening portion 14a and the one end of the reel leg 6a is pressed by the opening portion 14a, the reel leg 6a is biased (pressed) toward the reel leg placing surface 12a disposed in the fixed hood 14.

Note that the fixed hood 14 is not limited to being disposed integrally with the reel seat main body 12, and may be formed of a metal or a hard synthetic resin to have a structure separate from the reel seat main body 12 and firmly fixed to the reel seat main body 12. In a case of being formed of metal, it is preferable to dispose a resin member at a portion in contact with the reel leg 6a of the reel 6 to prevent damage to each member due to the contact between metals.

The movable hood 22 is formed in a sleeve shape penetrating an axial hole through which the screw portion (male screw portion) 18 of the reel seat main body 12 is inserted, and comprises the hood main body 26, and the reel leg holding portion 28 formed inside the hood main body 26. The hood main body 26 is formed of, for example, a synthetic resin. In addition, the nut 8 according to the embodiment of the present invention is rotatably connected to a rear portion (rod butt side) of the hood main body 26 of the movable hood 22. The nut 8 comprises the nut base portion to be described later and the cylindrical portion to be described later. The nut base portion is formed of, for example, a synthetic resin, a polyamide-based synthetic resin, an ABS resin, or the like, and the cylindrical portion is formed of, for example, a metal such as SUS, aluminum, or brass, but is not limited thereto.

In the nut 8 according to the embodiment of the present invention, a female screw portion 24 screwed into the screw portion (male screw portion) 18 of the reel seat main body 12 is formed on the inner peripheral side. In addition, a front end portion of the nut 8 (which refers to an end portion of the movable hood 22 on the hood main body 26 side) is connected (locked) to a rear end portion of the hood main body 26 of the movable hood 22 (which refers to an end portion of the nut 8 on the front end portion side) in a state of being relatively rotatable and prevented from falling off. More specifically, the nut 8 can be configured to comprise a locking portion 25 (refer to FIG. 3 to be described later) to be locked to a locked portion 23 (refer to FIG. 3 to be described later) at the rear end of the hood main body 26, and to be relatively rotatable and prevented from falling off. Note that a connection structure between the nut 8 and the hood main body 26 can be variously considered, and is not limited to a specific aspect.

The nut 8 according to the embodiment of the present invention is screwed with the screw portion (male screw portion) 18 of the reel seat main body 12 and is rotatably disposed. As described above, since the hood main body 26 is connected to the nut 8, when the nut 8 is rotated in a forward direction with respect to the screw portion (male screw portion) 18, the hood main body 26 of the movable hood 22 approaches the fixed hood 14 as the nut 8 approaches the fixed hood 14. On the other hand, when the nut 8 is rotated in a reverse direction with respect to the screw portion (male screw portion) 18, the hood main body 26 of the movable hood 22 is moved away from the fixed hood 14 as the nut 8 is moved away from the fixed hood 14.

The hood main body 26 moved in the axial direction of the reel seat main body 12 by the rotation of the nut 8 has an opening portion 26a that is opened on the front side and the inner peripheral side and is fixed in a state where the reel leg holding portion 28 for receiving the rear end of the reel leg 6a of the fishing reel 6 is disposed. The opening portion 26a of the hood main body 26 faces the opening portion 14a of the fixed hood 14 when the movable hood 22 is attached to the screw portion (male screw portion) 18 of the reel seat main body 12. Contrary to the opening portion 14a of the fixed hood 14, the opening portion 26a of the hood main body 26 is formed such that the height of the inner surface is gradually decreased toward the rear.

Figure 3:
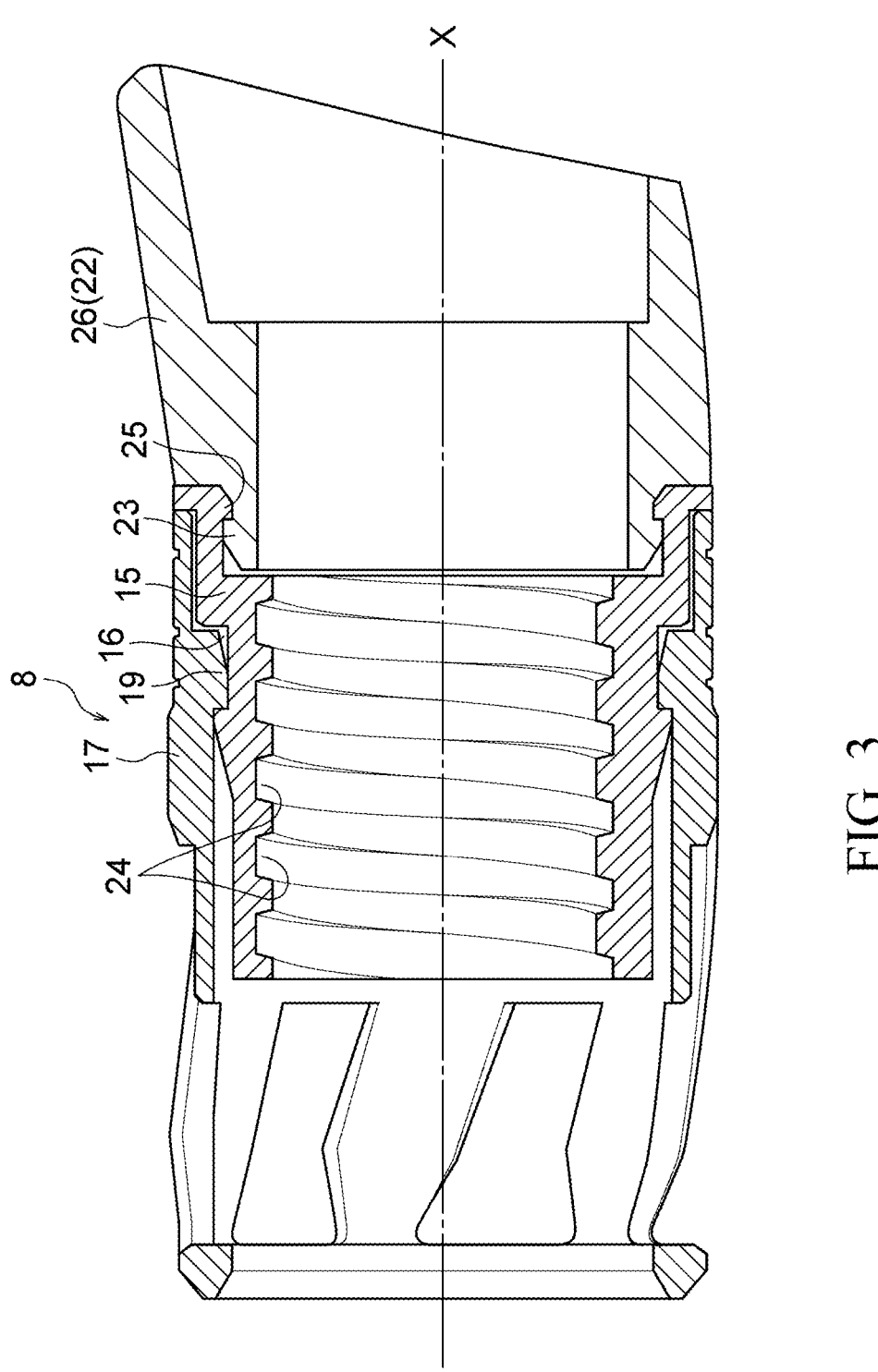
FIG. 3 is a view illustrating a sectional view of a nut according to an embodiment of the present invention.
Figure 4:
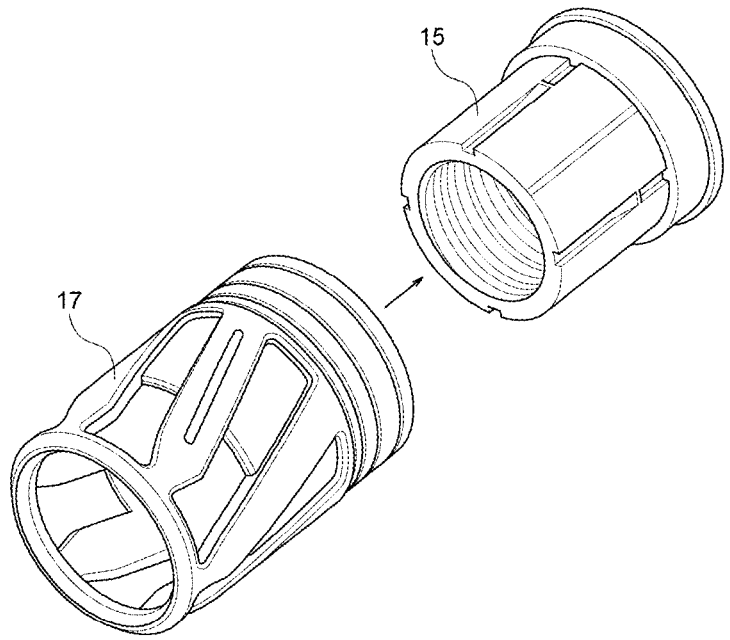
FIG. 4 is a view illustrating a nut base portion and a cylindrical portion of a nut according to an embodiment of the present invention.
Figures 5A, 5B:
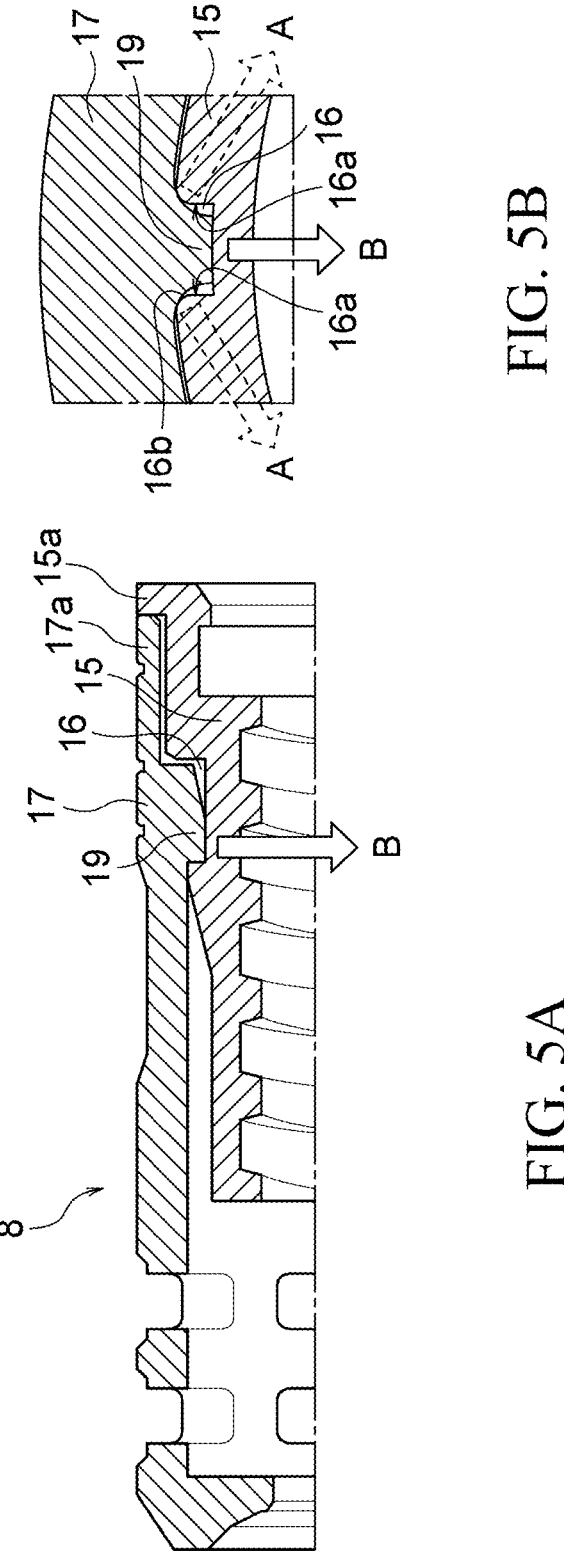
FIGS. 5A and 5B are views for describing press-fitting and fixing of a nut according to an embodiment of the present invention.
Figure 6A:
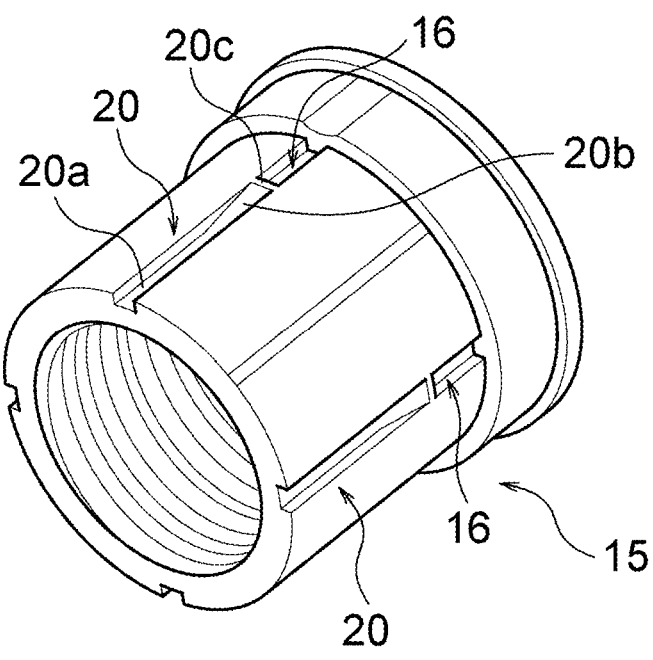
FIG. 6A is a perspective view of a nut base portion of a nut according to an embodiment of the present invention.
Figure 6B:
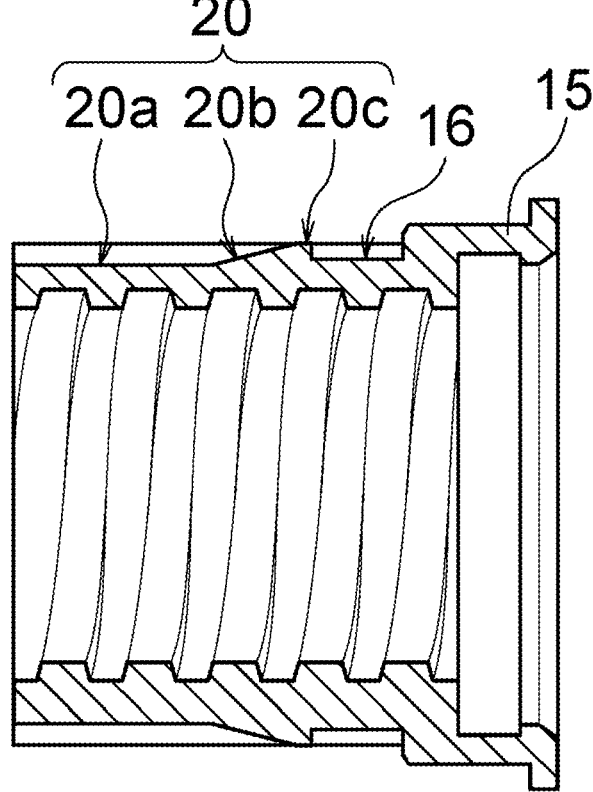
FIG. 6B is a sectional view of a nut base portion of a nut according to an embodiment of the present invention.
Figure 6C:
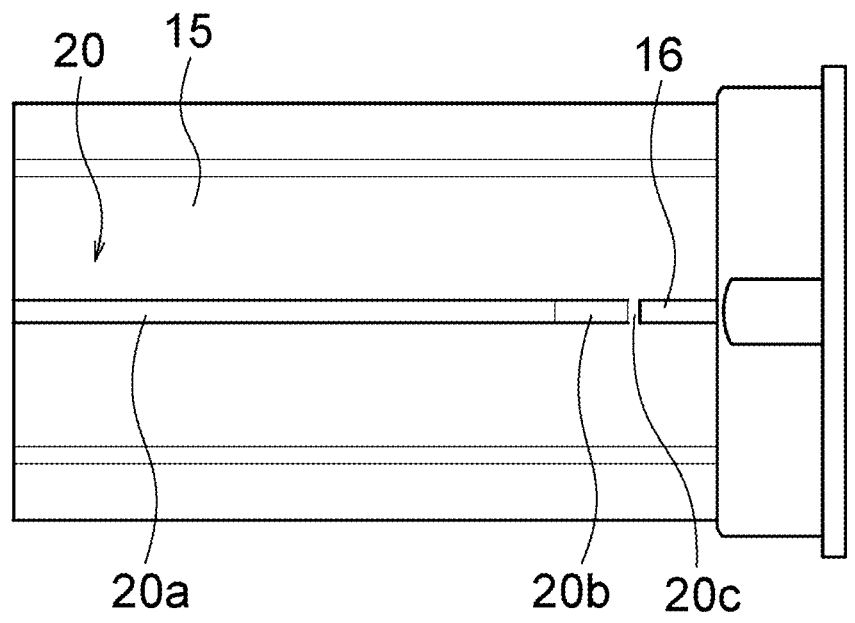
FIG. 6C is a side view of a nut base portion of a nut according to an embodiment of the present invention.
Figure 7A:
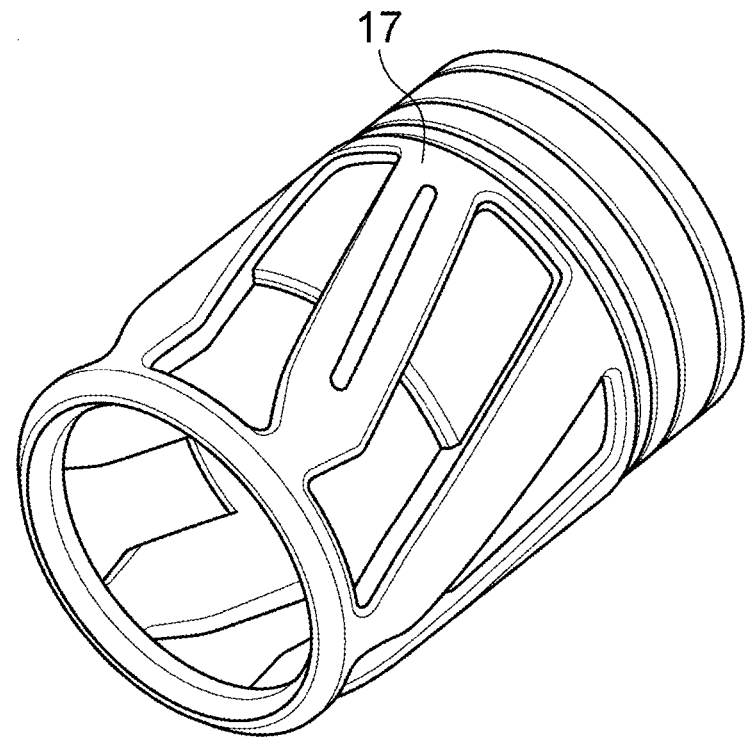
FIG. 7A is a perspective view of a cylindrical portion of a nut according to an embodiment of the present invention.
Figure 7B:
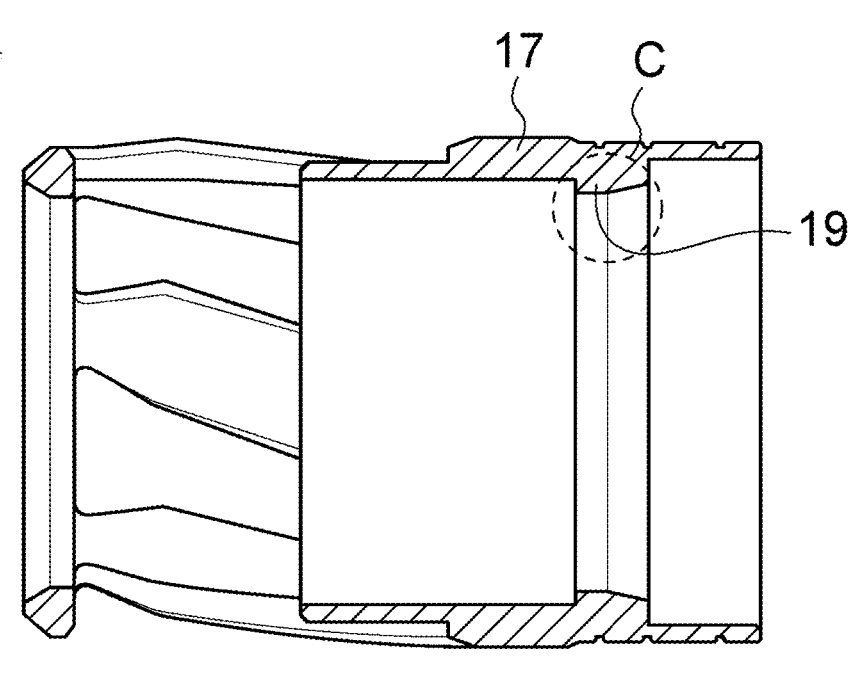
FIG. 7B is a first sectional view of a cylindrical portion of a nut according to an embodiment of the present invention.
Figure 7C:
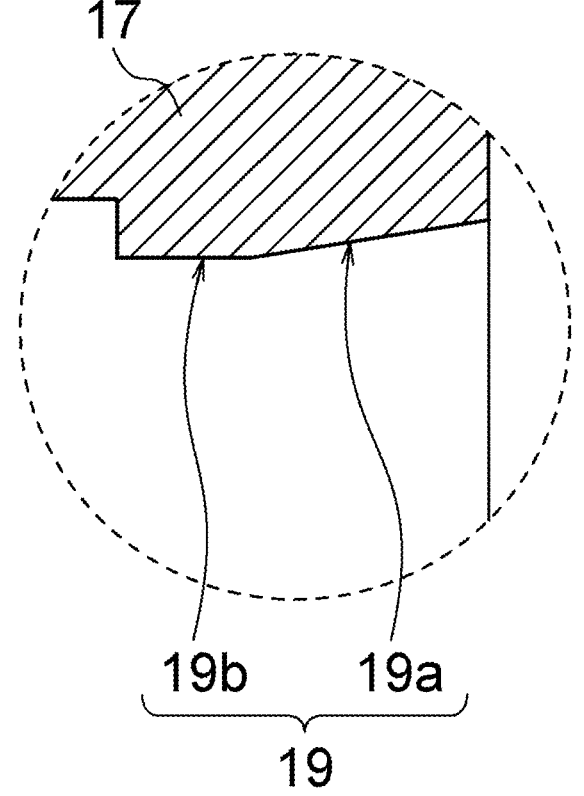
FIG. 7C is an enlarged view of a part (C) of a cross section of a cylindrical portion of a nut according to an embodiment of the present invention.
Figure 7D:
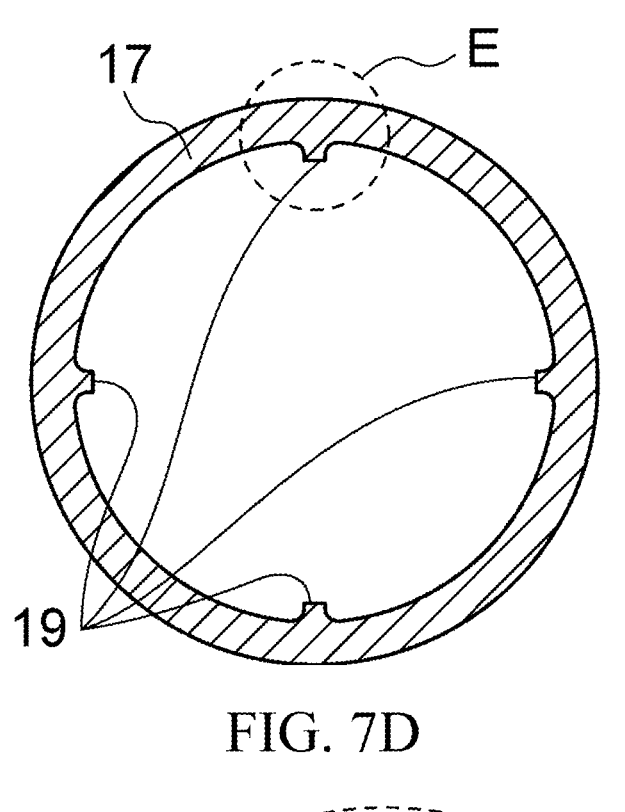
FIG. 7D is a second sectional view of a cylindrical portion of a nut according to an embodiment of the present invention.
Figure 7E:
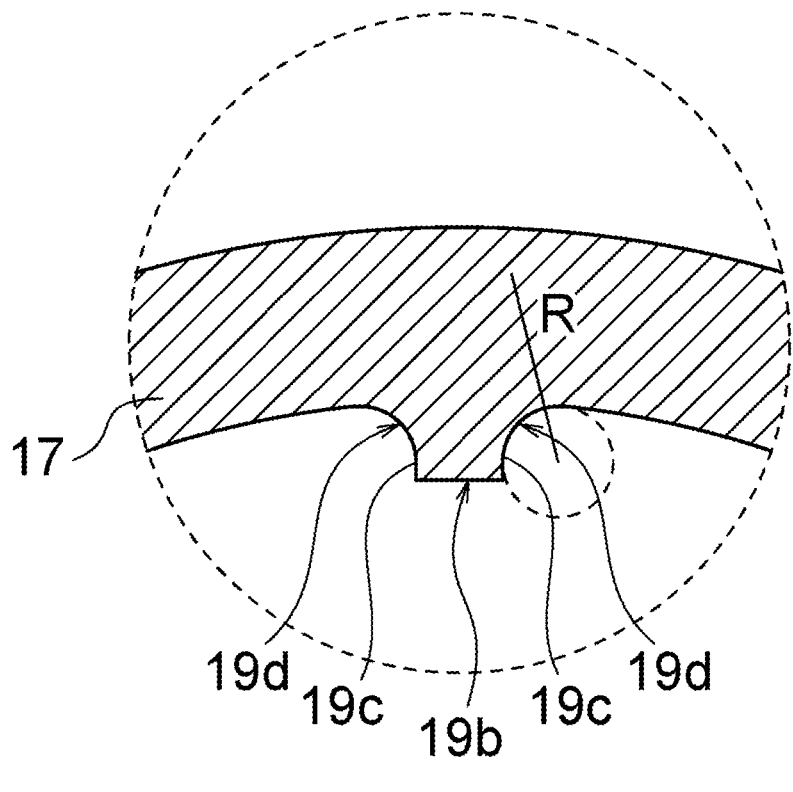
FIG. 7E is an enlarged view of a part (E) of a cross section of a cylindrical portion of a nut according to an embodiment of the present invention.

Next, details of the nut 8 according to the embodiment of the present invention will be further described with reference to FIGS. 2, 3, 4, 5, 6, and 7. FIG. 3 is a view illustrating a sectional view of the nut according to the embodiment of the present invention, FIG. 4 is a view illustrating the nut base portion and the cylindrical portion of the nut according to the embodiment of the present invention, and FIGS. 5A and 5B are views for describing press-fitting and fixing of the nut according to the embodiment of the present invention. FIG. 6A is a perspective view of the nut base portion of the nut according to the embodiment of the present invention, FIG. 6B is a sectional view of the nut base portion of the nut according to the embodiment of the present invention, and FIG. 6C is a side view of the nut base portion of the nut according to the embodiment of the present invention. FIG. 7A is a perspective view of the cylindrical portion of the nut according to the embodiment of the present invention, FIG. 7B is a first sectional view of the cylindrical portion of the nut according to the embodiment of the present invention, FIG. 7C is an enlarged view of a part (C) of a cross section of the cylindrical portion of the nut according to the embodiment of the present invention, FIG. 7D is a second sectional view of the cylindrical portion of the nut according to the embodiment of the present invention, and FIG. 7E is an enlarged view of a part (E) of a cross section of the cylindrical portion of the nut according to an embodiment of the present invention.

The nut 8 according to the embodiment of the present invention is for moving the hood main body 26 of the movable hood 22, the nut 8 is screwed with the male screw portion 18 of the reel seat main body 12 formed with a reel leg placing portion 12a on which the reel leg 6a is placed, and the nut 8 comprises: the nut base portion 15 which has an outer peripheral surface provided with the recessed portion 16 and an inner peripheral surface provided with the female screw portion 24 for movement that is screwed into the male screw portion 18 of the reel seat main body, and of which an end portion 25 is locked to an end portion 23 of the hood main body 26 of the movable hood 22; and the cylindrical portion 17 that has the protrusion portion 19 engaged with the recessed portion 16 such that the cylindrical portion is fixed on an outside of the nut base portion 15, in which in a state where the protrusion portion 19 of the cylindrical portion 17 is engaged with the recessed portion 16 of the nut base portion 15, the nut base portion 15 is press-fitted and fixed to receive a pressure in a circumferential direction (approximately the circumferential direction (direction indicated by arrow A in FIG. 5B) due to press-fitting) and a radial direction (radial direction (direction indicated by arrow B) due to press-fitting illustrated in FIGS. 5A and 5B) of the nut base portion 15 by the cylindrical portion 17. Here, the dimensional width of the press fitting of the cylindrical portion 17 into the nut base portion 15 is a width in a range of 0 mm to 0.25 mm, and more preferably a width in a range of 0.5 mm to 2.0 mm (note that even in a case where the dimensional width is 0 mm, the contact is made at at least one of the four positions in the circumferential direction because the cross-sectional shape is not a perfect circle). In this manner, as described above, the nut base portion 15 receives the pressure due to the press-fitting of the cylindrical portion 17, and the cylindrical portion 17 is press-fitted and fixed to the nut base portion 15 such that the nut base portion 15 having hardness relatively smaller (lower) than that of the cylindrical portion 17 is slightly deformed within a range not affecting the structure and function of the nut base portion 15. In this manner, it is possible to simply and effectively fix the cylindrical portion 17 to the nut base portion 15 while avoiding predetermined or more rattling therebetween only by not using an adhesive or by using an adhesive supplementarily.

With the nut 8 according to the embodiment of the present invention, it is possible to provide the nut capable of reliably performing the fixing between the cylindrical portion and the nut base portion while reducing rattling of the cylindrical portion with respect to the nut base portion in a rotation direction and the axial direction. More specifically, the nut base portion 15 reliably performs the fixing between the cylindrical portion 17 and the nut base portion 15 while reducing rattling in the rotation direction by applying a pressure in the circumferential direction (substantially circumferential direction (direction indicated by arrow A) due to press-fitting) of the nut base portion 15 by the cylindrical portion 17, and generates a frictional force between an upper surface portion 19b of the cylindrical portion 17 and the recessed portion 16 of the nut base portion 15 by generating a pressing force of the cylindrical portion 17 in the radial direction of the nut base portion 15 by applying a pressure in the radial direction (radial direction (direction indicated by arrow B) due to press-fitting), which makes it possible to reliably perform the fixing between the cylindrical portion 17 and the nut base portion 15 while reducing rattling in the axial direction (central axis X direction of the nut 8) of the cylindrical portion 17. Here, since an end portion 15a of the nut base portion 15 on the hood main body 26 side of the movable hood 22 is formed to protrude outward in the radial direction, an end portion 17a of the cylindrical portion 17 on the hood main body 26 side of the movable hood 22 abuts on the end portion 15a of the nut base portion 15 so that the movement of the cylindrical portion 17 toward the hood main body 26 side of the movable hood 22 in the central axis X direction of the nut 8 is restricted. In this manner, rattling of the cylindrical portion 17 in the axial direction (the central axis X direction of the nut 8) can be further reduced, and fixing between the cylindrical portion 17 and the nut base portion 15 can be more reliably performed.

Next, the structure of the nut base portion 15 in the nut 8 according to the embodiment of the present invention will be described with reference to FIGS. 6A to 6C. As illustrated in FIGS. 6A to 6C, in the nut 8 according to the embodiment of the present invention, the nut base portion 15 has one or a plurality of groove portions 20 that extend in the central axis direction of the nut base portion 15 and are formed on the outer peripheral surface of the nut base portion 15, and the recessed portion 16 is a part of the groove portion 20. In addition, in the nut 8 according to the embodiment of the present invention, each of the plurality of groove portions 20 comprises a base portion 20a, an inclined portion 20b, a top portion 20c, and the recessed portion 16 when viewed from the side of the groove portion 20 opposite to the hood main body 26 of the movable hood 22. In addition, in the nut 8 according to the embodiment of the present invention, each of the plurality of groove portions 20 may comprise the base portion 20*a*, the inclined portion 20*b*, the top portion 20*c*, a second inclined portion (not illustrated), and the recessed portion 16 when viewed from the side of the groove portion 20 opposite to the hood main body 26 of the movable hood 22. In this manner, when the cylindrical portion 17 is attached to the nut base portion 15, the protrusion portion 19 of the cylindrical portion 17 is guided by the base portion 20*a* of one groove portion 20 of the plurality of groove portions 20 and then guided to ride on the inclined portion 20*b*, and when the protrusion portion 19 exceeds the top portion 20*c* (in the case of having the second inclined portion, when the protrusion portion 19 is guided to descend along the second inclined portion exceeding the top portion 20*c*), the protrusion portion 19 of the cylindrical portion 17 is engaged to be fitted to the recessed portion 16 of the nut base portion 15, and the cylindrical portion 17 is fixed to the nut base portion 15.

Here, one or more groove portions 20 can be provided in the nut base portion 15. In a case where a plurality of groove portions 20 are provided in the nut base portion 15, the number of groove portions 20 can be any number of two or more (may be an even number or an odd number). In a case where the nut base portion 15 is provided with a plurality of groove portions 20, the number of groove portions 20 can be, for example, two or four, but is not limited thereto. In addition, in a case where the nut base portion 15 is provided with a plurality of groove portions 20 (for example, positions at 0°, 90°, 180°, and 270° in the circumferential direction), the cylindrical portion 17 can be provided with a plurality of protrusion portions 19 (for example, positions at 0°, 90°, 180°, and 270° in the circumferential direction) in accordance with the respective positions (for example, positions at 0°, 90°, 180°, and 270° in the circumferential direction) of the plurality of groove portions 20. In this manner, when the cylindrical portion 17 is attached to the nut base portion 15, each protrusion portion 19 of the cylindrical portion 17 is guided by the base portion 20*a* of each groove portion 20 of the plurality of groove portions 20 and then guided to ride on the inclined portion 20*b*, and when the protrusion portion 19 exceeds the top portion 20*c* (in the case of having the second inclined portion, when the protrusion portion 19 is guided to descend along the second inclined portion exceeding the top portion 20*c*), each protrusion portion 19 of the cylindrical portion 17 is engaged to be fitted to each recessed portion 16 of the nut base portion 15, and the cylindrical portion 17 is fixed to the nut base portion 15. By using the plurality of recessed portions 16 and the plurality of protrusion portions 19, the cylindrical portion 17 can be more firmly fixed to the nut base portion 15.

Next, with reference to FIGS. 7A to 7E, the structure of the cylindrical portion 17 in the nut 8 according to the embodiment of the present invention will be described. As illustrated in FIGS. 7A to 7E, in the nut 8 according to the embodiment of the present invention, the protrusion portion 19 of the cylindrical portion 17 is formed on the hood main body 26 side of the movable hood 22, and comprises an inclined portion 19*a* of which the height is increased as the distance from the hood main body 26 of the movable hood 22 is increased. In addition, in the nut 8 according to the embodiment of the present invention, the protrusion portion 19 of the cylindrical portion 17 comprises the above-described inclined portion 19*a* and the upper surface portion 19*b* as viewed in the central axis direction of the cylindrical portion 17 (central axis X direction of the nut 8).

In addition, in the nut 8 according to the embodiment of the present invention, the above-described upper surface portion 19*b* is configured to be a flat surface portion extending in the central axis direction of the cylindrical portion 17 (central axis X direction of the nut 8). In this manner, in a state where the cylindrical portion 17 is press-fitted and fixed to the nut base portion 15, the upper surface portion 19*b* of the cylindrical portion 17 is formed to press the surface of the nut base portion 15 on the bottom portion side of the recessed portion 16, and generates a pressing force of the cylindrical portion 17 in the radial direction of the nut base portion 15 by applying a pressure in the radial direction (radial direction (direction indicated by arrow B) due to press-fitting), thereby generating a frictional force between the upper surface portion 19*b* of the cylindrical portion 17 and the recessed portion 16 of the nut base portion 15. As a result, it is possible to reliably perform the fixing between the cylindrical portion 17 and the nut base portion 15 while reducing rattling of the cylindrical portion 17 in the axial direction (the central axis X direction of the nut 8).

In the nut 8 according to the embodiment of the present invention, the length of the protrusion portion 19 of the cylindrical portion 17 in the central axis direction of the cylindrical portion 17 (central axis X direction of the nut 8) is 3 mm or more. In addition, in the nut 8 according to the embodiment of the present invention, the length of the upper surface portion 19*b* in the central axis direction of the cylindrical portion 17 (central axis X direction of the nut 8) in a case where the upper surface portion 19*b* is the flat surface portion is a length in a range of 0.3 mm to 1.5 mm.

In the nut 8 according to the embodiment of the present invention, the protrusion portion 19 of the cylindrical portion 17 comprises the upper surface portion 19*b* and a curved portion 19*c* extending from both sides of the upper surface portion 19*b* in the circumferential direction when viewed in the circumferential direction of the cylindrical portion 17, and a roundness radius (R) at an end portion 19*d* of the curved portion 19*c* on a side opposite to the upper surface portion 19*b* is a size in a range of 0.5 mm to 0.8 m. In this manner, as illustrated in FIG. 2, an end portion 16*b* of a side wall 16*a* forming the recessed portion 16 of the nut base portion 15 is pressed against the rounded end portion 19*d* of both curved portions 19*c* of the cylindrical portion 17, and a pressure substantially in the circumferential direction (direction indicated by arrow A) due to the press-fitting is applied, thereby reducing rattling in the rotational direction.

In the nut 8 according to the embodiment of the present invention, the depth of the base portion 20*a* of the groove portion 20 (the depth of the nut base portion 15 in the radial direction) is deeper than the depth of the recessed portion 16 of the groove portion 20 (the depth of the nut base portion 15 in the radial direction) in a range of 0.1 mm to 0.2 mm. In this manner, the protrusion portion 19 can be easily guided by the groove portion 20.

The nut 8 according to the embodiment of the present invention comprises the inclined portion 19*a* of the protrusion portion 19 of the cylindrical portion 17, and an inclination angle of the inclined portion 20*b* of the groove portion 20 is configured to be the same as or different from an inclination angle of the inclined portion 19*a* of the protrusion portion 19 of the cylindrical portion 17. In this manner, the protrusion portion 19 can be easily locked to the recessed portion 16.

The fishing rod reel seat 9 according to the embodiment of the present invention comprises any one of the nuts 8 described above. With the fishing rod reel seat 9 comprising the nut 8 according to the embodiment of the present invention, it is possible to provide the nut capable of reliably performing the fixing between the cylindrical portion and the nut base portion while reducing rattling of the cylindrical portion with respect to the nut base portion in a rotation direction and the axial direction. More specifically, the nut base portion 15 reliably performs the fixing between the cylindrical portion and the nut base portion while reducing rattling in the rotation direction by applying a pressure in the circumferential direction (substantially circumferential direction (direction indicated by arrow A) due to press-fitting) of the nut base portion 15 by the cylindrical portion 17, and generates a frictional force between the upper surface portion 19*b* of the cylindrical portion 17 and the recessed portion 16 of the nut base portion 15 by generating a pressing force of the cylindrical portion in the radial direction of the nut base portion by applying a pressure in the radial direction (radial direction (direction indicated by arrow B) due to press-fitting), which makes it possible to reliably perform the fixing between the cylindrical portion and the nut base portion while reducing rattling in the axial direction.

The fishing rod 1 according to the embodiment of the present invention comprises the fishing rod reel seat 9 comprising any one of the nuts 8 described above, and the rod body 2. With the fishing rod 1 comprising the nut 8 according to the embodiment of the present invention, it is possible to provide the nut capable of reliably performing the fixing between the cylindrical portion and the nut base portion while reducing rattling of the cylindrical portion with respect to the nut base portion in a rotation direction and the axial direction. More specifically, the nut base portion 15 reliably performs the fixing between the cylindrical portion and the nut base portion while reducing rattling in the rotation direction by applying a pressure in the circumferential direction (substantially circumferential direction (direction indicated by arrow A) due to press-fitting) of the nut base portion 15 by the cylindrical portion 17, and generates a frictional force between the upper surface portion 19*b* of the cylindrical portion 17 and the recessed portion 16 of the nut base portion 15 by generating a pressing force of the cylindrical portion in the radial direction of the nut base portion by applying a pressure in the radial direction (radial direction (direction indicated by arrow B) due to press-fitting), which makes it possible to reliably perform the fixing between the cylindrical portion and the nut base portion while reducing rattling in the axial direction.

The nut according to the embodiment of the present invention is for moving a hood main body of a movable hood, the nut is screwed with a male screw portion of a reel seat main body formed with a reel leg placing portion on which a reel leg is placed, and the nut comprises: a nut base portion which has an outer peripheral surface provided with a protrusion portion and an inner peripheral surface provided with a female screw portion for movement that is screwed into the male screw portion of the reel seat main body, and of which an end portion is locked to the hood main body of the movable hood; and a cylindrical portion that has a recessed portion engaged with the protrusion portion such that the cylindrical portion is fixed on an outside of the nut base portion, in which in a state where the recessed portion of the cylindrical portion is engaged with the protrusion portion of the nut base portion, the nut base portion is press-fitted and fixed in a circumferential direction and a radial direction of the nut base portion by the cylindrical portion. With the nut according to the embodiment of the present invention, it is possible to provide the nut capable of reliably performing the fixing between the cylindrical portion and the nut base portion while reducing rattling of the cylindrical portion with respect to the nut base portion in a rotation direction and the axial direction.

Figure 8:
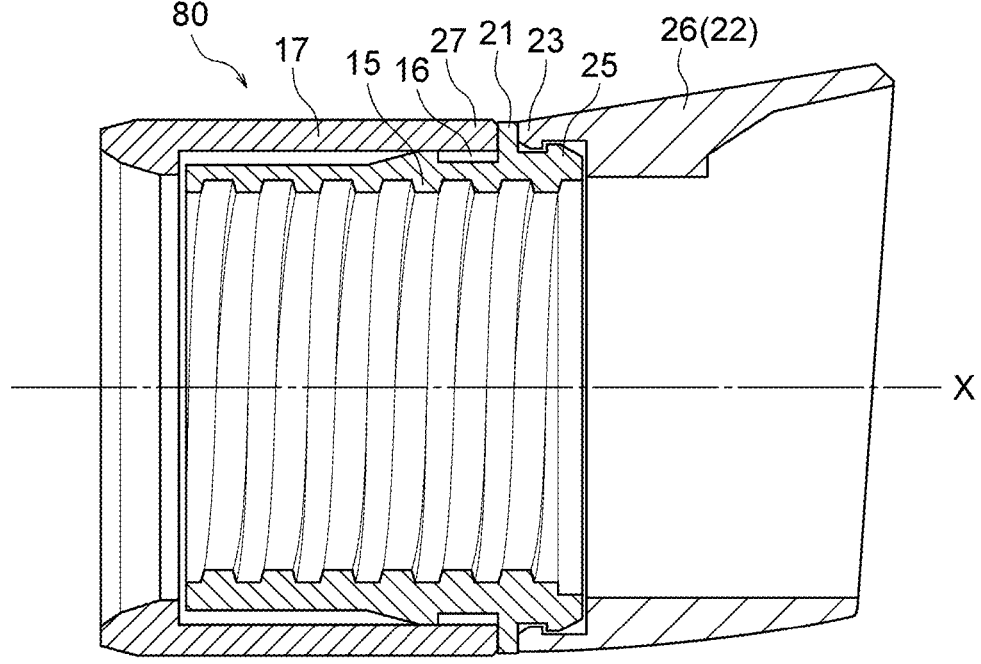
FIG. 8 is a view illustrating a nut according to another embodiment of the present invention.

Next, a nut 80 according to another embodiment of the present invention will be described with reference to FIG. 8. A basic structure of the nut 80 according to the other embodiment of the present invention is similar to that of the nut 8 according to the embodiment of the present invention described above, and thus description thereof is omitted, but a specific structure of the nut 80 according to the other embodiment of the present invention will be described. As illustrated in the drawing, in the nut 80 according to the other embodiment of the present invention, the hood main body 26 of the movable hood 22 has an end portion provided with the locked portion 23, and the nut base portion 15 has an end portion provided with the locking portion 25. However, the locked portion 23 is provided on the outer side of the nut 80 in the radial direction, the locking portion 25 is provided on the inner side of the nut 80 in the radial direction, and the locking portion 25 is locked to the locked portion 23 from the inner side in the radial direction. In addition, in the nut 80 according to the other embodiment of the present invention, the nut base portion 15 comprises a protrusion wall 21 between the recessed portion 16 and the locking portion 25, and an end portion 27 of the cylindrical portion 17 on the hood main body 26 side of the movable hood 22 is provided to abut against the protrusion wall 21. In this manner, the movement of the cylindrical portion 17 toward the hood main body 26 side of the movable hood 22 in the central axis X direction of the nut 80 is restricted. In this manner, rattling of the cylindrical portion 17 in the axial direction (the central axis X direction of the nut 80) can be reduced, and fixing between the cylindrical portion 17 and the nut base portion 15 can be reliably performed.

Dimensions, materials, and arrangements of the components described in this specification are not limited to those explicitly described in the embodiments, and the components may be modified to have any dimensions, materials, and arrangements that may fall within the scope of the present invention. Components not explicitly described in the present specification can also be added to the described embodiments, or some of the components described in the embodiments can be omitted.

REFERENCE SIGNS LIST

1 fishing rod
2 rod body
3 base rod
5 middle rod
6 reel
6*a* reel leg
7 tip rod
8 nut
9 reel seat
10 fishing line guide
12 reel seat main body
12*a* reel leg placing surface
13 cylindrical portion placing surface
14 fixed hood
15 nut base portion
16 recessed portion
17 cylindrical portion
18 screw portion (male screw portion)

19 protrusion portion
20 groove portion
20*a* base portion
20*b* inclined portion
20*c* top portion
21 protrusion wall
22 movable hood
23 locked portion
24 female screw portion
25 locking portion
26 hood main body
27 end portion
28 reel leg holding portion
80 nut

What is claimed is:

1. A nut for moving a hood main body of a movable hood by being screwed with a male screw portion of a reel seat main body with a reel leg placing portion on which a reel leg is placed, the nut comprising:

a nut base portion which has an outer peripheral surface with at least one recessed portion and an inner peripheral surface with a female screw portion for movement by being screwed into the male screw portion of the reel seat main body, and of which an end portion is locked to the hood main body; and a cylindrical portion that has a protrusion portion engaged with the recessed portion such that the cylindrical portion is fixed on an outside of the nut base portion, wherein in a state where the protrusion portion is engaged with the recessed portion, the nut base portion is press-fitted and fixed in a circumferential direction and a radial direction of the nut base portion by the cylindrical portion, the nut base portion has a plurality of groove portions that extend in a central axis direction of the nut base portion and are on an outer peripheral surface of the nut base portion, and each of the groove portions includes one of the recessed portion, each of the groove portions comprises, in order from a side of opposite to the hood main body, a base portion, an inclined portion, a top portion, and the recessed portion, which is recessed relative to the top portion, and the top portion is a radially outer-most surface of the groove portion that is axially in line with the base portion, the inclined portion and the recessed portion.

2. The nut according to claim 1, wherein the protrusion portion of the cylindrical portion comprises an inclined portion that is formed on the hood main body side of the movable hood and of which a height is increased as a distance from the movable hood is increased.

3. The nut according to claim 1, wherein the protrusion portion of the cylindrical portion comprises the inclined portion and an upper surface portion as viewed in a central axis direction of the cylindrical portion.

4. The nut according to claim 3, wherein the upper surface portion is a flat surface portion extending in the central axis direction of the cylindrical portion.

5. The nut according to claim 1, wherein a length of the protrusion portion of the cylindrical portion in a central axis direction of the cylindrical portion is 3 mm or more.

6. The nut according to claim 4, wherein a length of the flat surface portion in the central axis direction of the cylindrical portion is a length in a range of 0.3 mm to 1.5 mm.

7. The nut according to claim 3, wherein the protrusion portion of the cylindrical portion comprises the upper surface portion and a curved portion extending from both sides of the upper surface portion in the circumferential direction as viewed in the circumferential direction of the cylindrical portion, and a roundness radius (R) of an end portion of the curved portion on a side opposite to the upper surface portion is a size in a range of 0.5 mm to 0.8 m.

8. The nut according to claim 1, wherein the plurality of groove portions are two or more groove portions.

9. The nut according to claim 1, wherein a depth of the base portion of the groove portion is deeper than a depth of the recessed portion of the groove portion in a range of 0.1 mm to 0.2 mm.

10. The nut according to claim 1, wherein the nut base portion has hardness lower than hardness of the cylindrical portion.

11. The nut according to claim 1, wherein the protrusion portion of the cylindrical portion has an inclined portion, and an inclination angle of the inclined portion of the groove portion is the same as or different from an inclination angle of the inclined portion of the protrusion portion of the cylindrical portion.

12. The nut according to claim 1, wherein the radially outer-most surface is continuous with an outer cylindrical surface adjacent to the groove portions.

13. A fishing rod reel seat comprising the nut according to claim 1.

14. A fishing rod comprising:

a fishing rod reel seat comprising the nut according to claim 1; and a rod body.

15. A nut for moving a hood main body of a movable hood by being screwed with a male screw portion of a reel seat main body with a reel leg placing portion on which a reel leg is placed, the nut comprising:

a nut base portion which has an outer peripheral surface with a protrusion portion and an inner peripheral surface with a female screw portion for movement by being screwed into the male screw portion of the reel seat main body, and of which an end portion is locked to the hood main body; and a cylindrical portion that has at least one recessed portion engaged with the protrusion portion such that the cylindrical portion is fixed on an outside of the nut base portion, wherein in a state where the second recessed portion is engaged with the first protrusion portion, the nut base portion is press-fitted and fixed in a circumferential direction and a radial direction of the nut base portion by the cylindrical portion, the cylinder portion has a plurality of groove portions that extend in a central axis direction of the cylinder portion and are on an inner peripheral surface of the cylinder portion, and each of the groove portions includes one of the recessed portion, and each of the groove portions comprises, in order from a side of opposite to the hood main body, a base portion, an inclined portion, a top portion, and the recessed portion, which is recessed relative to the top portion, and the top portion is a radially inner-most surface of the groove portion that is axially in line with the base portion, the inclined portion and the recessed portion.

16. The nut according to claim 15, wherein the radially outer-most surface is continuous with an outer cylindrical surface adjacent to the groove portions.

* * * * *